United States Patent [19]

Yamazawa et al.

[11] Patent Number: 4,627,307

[45] Date of Patent: Dec. 9, 1986

[54] FIBER-REINFORCED PLASTIC CORE MATERIAL FOR STEERING WHEELS

[75] Inventors: Yasushi Yamazawa; Yasuhiro Tsutiya; Masaki Terada; Tosio Aoki; Hiroyuki Sato, all of Toyota, Japan

[73] Assignee: Toyota Jidosha Kabushiki Kaisha, Toyota, Japan

[21] Appl. No.: 757,498

[22] Filed: Jul. 22, 1985

[30] Foreign Application Priority Data

Sep. 6, 1984 [JP] Japan .................................. 59-186790

[51] Int. Cl.4 ............................................. B62D 1/04
[52] U.S. Cl. ...................................... 74/552; 264/258; 156/166; 156/169; 156/172
[58] Field of Search ......................... 74/491, 492, 552; 264/136, 137, 257, 258; 156/166, 169, 172, 173, 175, 245, 433, 441

[56] References Cited

U.S. PATENT DOCUMENTS 3,738,885  6/1973  Lecomte ............................ 156/177
4,419,908 12/1983  Reikowski ............................ 74/552
4,465,301  8/1984  Bongers et al. ...................... 74/492

FOREIGN PATENT DOCUMENTS 2515094  4/1983  France .
2004835  4/1979  United Kingdom .
2041858  9/1980  United Kingdom .
2061848  5/1981  United Kingdom .

*Primary Examiner*—Larry I. Schwartz
*Attorney, Agent, or Firm*—Oblon, Fisher, Spivak, McClelland & Maier

[57] ABSTRACT

A core material for steering wheels, comprising a boss equipped with sleeves in a unitary structure, each of which sleeves has a slit in the axial direction thereof, said sleeves further being packed with superposed fiber strands; a ring portion; and spoke portions which connect said ring portion to said boss and being formed by winding and stretching continuous long-staple fiber strands impregnated with a resin to form the superposed strands within said sleeves.

9 Claims, 12 Drawing Figures

FIBER-REINFORCED PLASTIC CORE MATERIAL FOR STEERING WHEELS

BACKGROUND OF THE INVENTION

1. Field of the Invention

The present invention relates to a core material for the construction of steering wheels of automobiles which is formed by superposing continuous resin impregnated, long-staple fiber strands with a hardening resin.

2. Description of the Background

Steering wheels of automobiles have in the past been made of synthetic resins in order to help in the reduction of the overall weight of automobiles. However, the synthetic resins alone do not provide a steering wheel with strength. In order to increase the strength of steering wheels, therefore, the core material generally has been made of steel. This fact, however, precludes any substantial weight reduction in manufactured steering wheels.

A method which has been developed in the past which enables the preparation of a predetermined shape by winding a continuous long-staple fiber strand that is obtained by impregnating continuous long-staple fibers (roving or strand) such as carbon fibers with a synthetic resin such as epoxy resin or the like (see British Patent Publication GB No. 2004835A) on a frame or a mold. The structure which is formed by this method exhibits great compressive strength or tensile strength in the lengthwise direction of the fibers. FIGS. 10 and 11 illustrate core materials which have been used in the preparation of steering wheels by the above method. FIG. 10 shows a conventional technique in which a continuous fiber strand is superposed from the side of a ring portion 11a of a steering wheel core material 11 to the side of a boss 12 to form a spoke portion 13. The fibre strand is then wound around the periphery of the boss 12, and is returned to the side of the same spoke portion 13 or another spoke portion 13 thereby forming the whole at spoke portions 13.

FIG. 11 shows a conventional method in which the fiber strand from the side of a ring portion 11a of the steering wheel core material 11 is wound on a pin 14 provided on the boss 12, and then the fiber strand is superposed and stretched again toward the side of ring portion 11a, to form the spoke portions 13. The steering wheel core material 11 thus obtained is lighter than conventional materials, because a fiber-reinforced resin is used to form the core material instead of a steel core. However, these methods result in the occurrence of voids S in the base of spoke portions 13 on the side of boss 12, as shown in FIG. 12, where the superposed fiber strand 15 is partially branched. Therefore, the continuous long-staple fiber strand 15 has a reduced density at this branched area, and as a result spoke 13 loses stiffness. Further, if an external force is imparted to the steering wheel core material 11, it is probable that the superposed fibers will peel from one another on the side of the boss 12, because the direction of the force imparted is different from the lengthwise direction of the continuous long-staple fibers constituting the spoke 13. A need therefore continues to exist for an improved method by which such structures as steering wheels can be made of light weight materials, while retaining good strength characteristics.

SUMMARY OF THE INVENTION

Accordingly, one object of the present invention is to provide a core material for steering wheels from superposed continuous long-staple fiber strands, which does not lose its stiffness at the branched portions of the spokes near the boss where the density of the fiber strands decreases.

Another object of the present invention is to provide a core material for steering wheels which prevents the branched portions from peeling off when a force is impacted on the ring of a steering wheel.

Briefly, these objects and other objects of the present invention as hereinafter will become more readily apparent can be attained with a core material for steering wheels which comprises a boss equipped with sleeves in a unitary structure, which sleeves have a slit in the axial direction of the sleeves, said sleeves further bing packed with fiber strands; a ring portion; and spoke portions which connect said ring portion to said boss and being formed by winding and stretching continuous long-staple fiber strands impregnated with a resin to form the superposed strands within said sleeve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
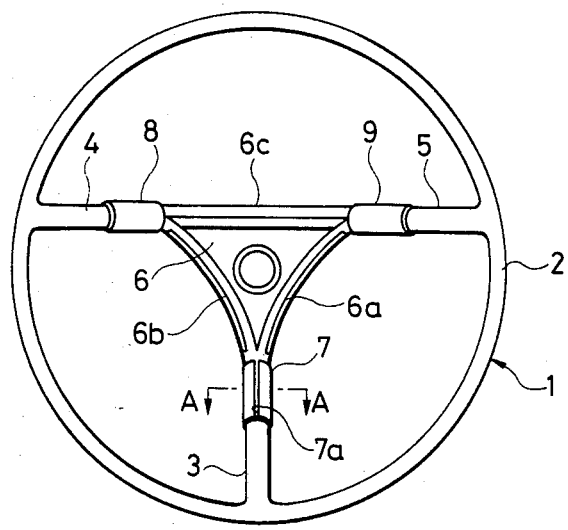
FIG. 1 is a front view of an embodiment of the present invention.

The present invention will not be described in terms of the embodiments of the invention shown in the drawings.

Figure 3:
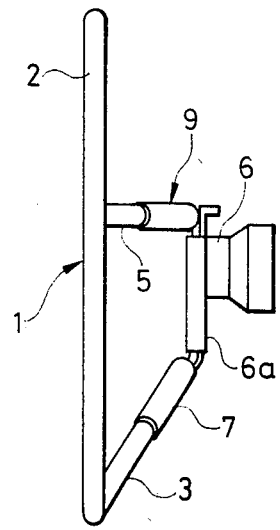
FIG. 3 is a right side view of the embodiment shown in FIG. 1.
Figure 2:
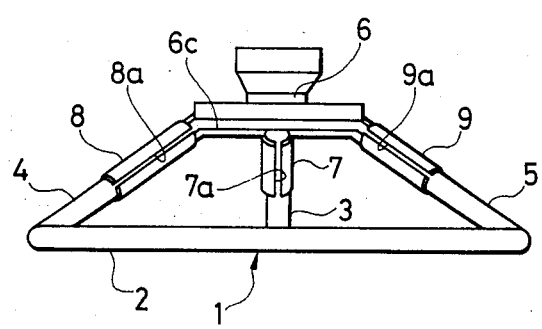
FIG. 2 is a plan view of the embodiment shown in FIG. 1.
Figure 4:
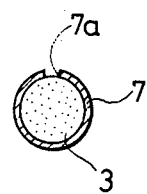
FIGS. 4 and 5 are sectional views along the line A—A of FIG. 1, and illustrate lateral sectional views of the sleeves.
Figure 5:
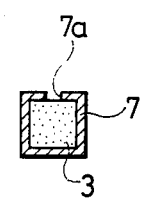

In FIGS. 1 to 3, numeral 1 denotes a core material for a steering wheel, which consists of a ring portion 2, three spoke portions 3, 4 and 5, and boss 6. The individual portions other than boss 6 are formed by superposing continuous long-staple fiber strands which consist of continuous long-staple fibers such as carbon fibers or glass fibers impregnated with a resin such as an epoxy resin, an unsaturated polyester resin, or a phenolic resin. The boss 6 has, at portions corresponding to the spoke portions 3, 4 and 5, sleeves 7, 8 and 9 which are made of a light metal, that are formed by compression into a unitary structure together with the boss. The sleeves 7, 8 and 9 have vertical slits 7a, 8a, and 9a which stretch in the axial direction and through which the continuous long-staple fiber strands can be introduced and superposed in the sleeves. The sleeves 7, 8 and 9 have a sectional shape that corresponds to any desired sectional shape of the spoke portions 3, 4 and 5. In the embodiments in FIGS. 4 and 5, the sleeves have a cross-sectional circular shape or a square shape.

Guide planes 6a, 6b, and 6c, which curve inwardly, terminate in pairs in sleeves 7, 8, and 9 of boss 6 to form edges that guide continuous long-staple fiber strands which are to be wound and superposed in the structure as shown in FIG. 1.

In portions of spokes 3, 4 and 5 on the side of the boss 6, the continuous long-staple fiber strands are wound while passing through sleeves 7, 8 and 9 as they are introduced therein through vertical slits 7a, 8a, and 9a. Accordingly, the fiber strands are densely packed in sleeves 7, 8 and 9 to increase the stiffness of spoke portions 3, 4 and 5 on the side of boss 6. Therefore, even when an external force is exerted on the steering wheel ring, and a large twisting force or bending force is exerted on spoke portions 3, 4 and 5 on the side of the boss 6, the spoke portions 3, 4 and 5 are not deformed since they have increased stiffness on the side of boss 6. Furthermore, the fibers which form spoke portions 3, 4 and 5 are held by the sleeves and will not peel from each other.

Figure 6:
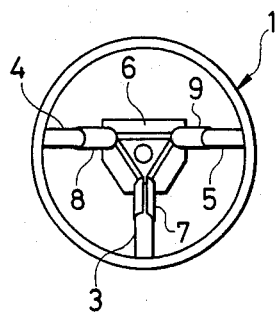
FIGS. 6 and 7 are front views which show other embodiments of the present invention.
Figure 7:
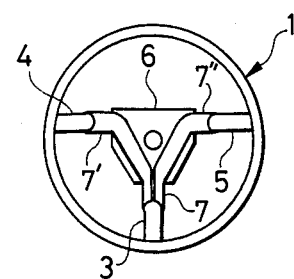

FIGS. 6 and 7 show other embodiments of the present invention, wherein the sleeves 7, 8 and 9, and the boss 6 are formed together as a unitary structure by welding. FIG. 7 shows an embodiment in which the sleeves 7, 8 and 9 of FIG. 6 are formed as a unitary structure in the shape of a fork end, and are welded to the boss 6. In this case, the branched portion is protected by the sleeve 7, but no branched portion is formed at the other end 7' and 7" of the fork end. Therefore, further increased stiffness is exhibited among the spokes 3, 4 and 5.

Figure 8:
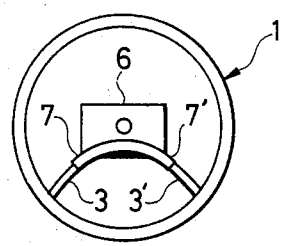
FIGS. 8 and 9 are front views which show further embodiments of the present invention.
Figure 9:
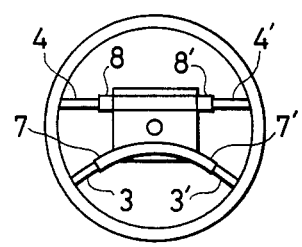
Figure 10:
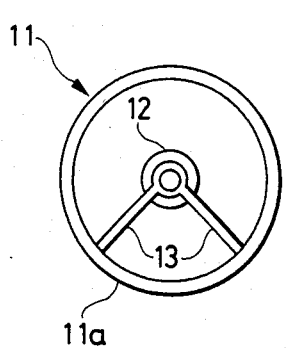
FIGS. 10 and 11 are front views which show conventional core materials for the construction of steering wheels.
Figure 11:
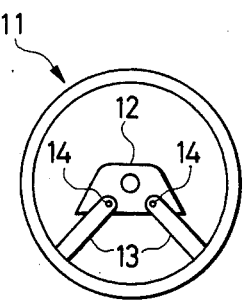
Figure 12:
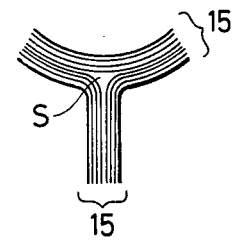
FIG. 12 is a diagram which shows a portion where the superposed continuous long-staple fiber strands are branched near the boss of FIGS. 10 and 11.

FIGS. 8 and 9 show further embodiments of the present invention, wherein FIG. 8 shows an embodiment which has two spoke portions. In this case, an arcuate sleeve is welded to the boss, and both ends 7 and 7' thereof run along the spoke portions 3 and 3'. Therefore, no branched portion is formed in the fiber strands that are superposed and wound, and the spoke portions are very stiff on the side of the boss.

FIG. 9 shows an embodiment which has four spoke portions, i.e., which has spoke portions 4 and 4' in addition to those of FIG. 8. In the embodiment, a straight pipe is welded onto the boss 6, and spoke portions 4 and 4' stretch from both ends 8 and 8' of the pipe. In this embodiment, no branched portion is formed in the fiber strands that are superposed in the spike portions near the boss, and the fibers do not peel off from each other when an external force is exerted on the spoke portions.

In the preparation of the core material for the steering wheels of the present invention, the boss and the sleeves may be formed into a unitary structure by welding or these components may be formed into a unitary structure from the beginning by compression. The boss may be provided with a guide portion to guide the winding and lamination of continuous fiber strands. Any given sleeve may have a sectional shape that is nearly the same as the sectional shape of the spoke of the wheel. However, the spike may have any cross-sectional shape and is not limited to a circular shape or a square shape.

In the construction of the core material for the present steering wheel which is made of a fiber-reinforced resin, the continuous long-staple fiber strands are packed and superposed in the sleeves to form portions of spokes on the side of the boss. That is, the continuous long-staple fiber strands are densely superposed in the sleeves, making it possible to increase the stiffness of the spoke portions on the side of the boss. The sleeves also contain the fiber strands, i.e., the fiber strands are prevented from peeling at the branched portions, and the stiffness is increased.

Having now fully described this invention, it will be apparent to one of ordinary skill in the art that many changes and modifications can be made thereto without departing from the spirit or scope of the invention as set forth herein.

What is claimed as new and is intended to be secured by the Letters Patent is:

1. A method of forming a core material for steering wheels, comprising the steps of:
    setting a boss in the center of a jig formed in the shape of a ring which has spoke portions, said boss having sleeves each of which is provided with a slit and being positioned relative to said jig such that said sleeve align with the spoke portions of said jig;
    forming at least two spokes of said core material by winding and stretching, in a superposed manner, continuous long-staple fiber strands impregnated with a resin around the boss and the spoke portions of said jig, while introducing said continuous long-staple fiber strands into said sleeves through the slits therein; and
    removing said jigs after said resin has hardened.

2. A core material for steering wheels, comprising:
    a boss equipped with sleeves in a unitary structure and located within a ring portion in its center, each of which sleeves has a slit in the axial direction thereof, said sleeves further being packed with superposed fiber strands; and
    spoke portions which connect said ring portion to said boss through said sleeves which join each of said spoke portions to said boss and being formed by winding and stretching continuous long-staple fiber strands impregnated with a resin through said slits in each of said sleeves to form the superposed strands within said sleeves.

3. The core material of claim 2, wherein said sleeves are circular in cross-section.

4. The core material of claim 2, wherein said sleeves are non-circular in cross-section.

5. The core material if claim 2, wherein the slit of each sleeve is parallel to the straight line of each of said spokes.

6. The core material of claim 2, wherein said sleeves are provided only for the spoke portions close to said boss.

7. The core material of claim 2, wherein said spoke portions run through a sleeve and are stretched to said ring portion from both ends of said sleeve.

8. The core material of any one of claim 2 to 7, wherein said sleeves form a unitary structure with said boss by being connected to the ends of said boss.

9. The core material of any one of claims 2 to 7, wherein said sleeves are formed separately from each other, and are welded onto the boss.

* * * * *